United States Patent [19]

Moran et al.

[11] 3,894,130
[45] July 8, 1975

[54] METHOD FOR PRODUCING SELF RETAINING KNOB

[75] Inventors: Thomas M. Moran, Cleveland; Joseph H. Paskert, Lakewood, both of Ohio

[73] Assignee: Eaton Corporation, Cleveland, Ohio

[22] Filed: June 22, 1973

[21] Appl. No.: 372,574

Related U.S. Application Data

[62] Division of Ser. No. 258,965, June 2, 1972, Pat. No. 3,808,635.

[52] U.S. Cl. .................... 264/25; 264/295; 264/339
[51] Int. Cl. ............................................. B29c 17/02
[58] Field of Search ........... 264/294, 295, 296, 339, 264/25

[56] References Cited
UNITED STATES PATENTS

| | | | |
|---|---|---|---|
| 2,450,448 | 10/1948 | Sawyer | 264/294 X |
| 2,952,037 | 9/1960 | Ruck | 264/295 X |
| 3,796,780 | 3/1974 | Schurman | 264/296 X |

Primary Examiner—Richard R. Kucia
Attorney, Agent, or Firm—Teagno & Toddy

[57] ABSTRACT

A method for producing one-piece all plastic knob adapted for self retention on a standard shaft. The knob includes a guideway substantially conforming to the shaft for receiving the shaft in proper axial relation to the knob. A resilient member having an aperture through which the shaft must pass upon insertion into the guideway is provided in a position where the aperture is partially offset from the guideway. Upon insertion of the shaft through the guideway and aperture, the resilient member is resiliently deformed and resiliently engages the shaft. The undeformed position of the resilient member may be varied in accordance with the required degree of shaft retention. The self-retaining knob is produced by first providing at least two members defining an aligned, shaft receiving guideway and aperture and then selectively off-setting one of the members in respect to the other.

4 Claims, 9 Drawing Figures

PATENTED JUL 8 1975  3,894,130
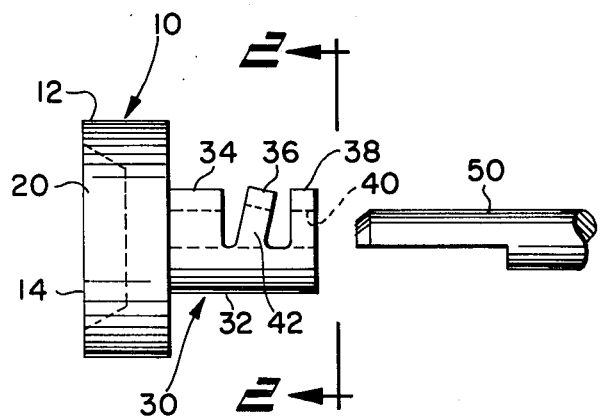
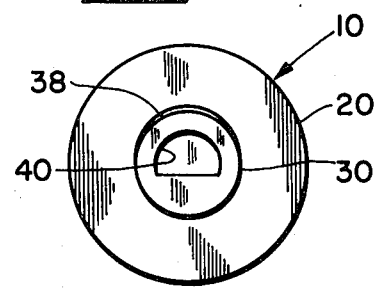
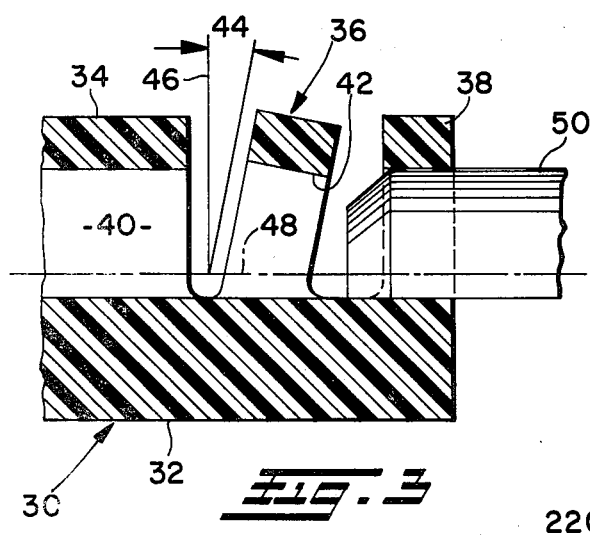
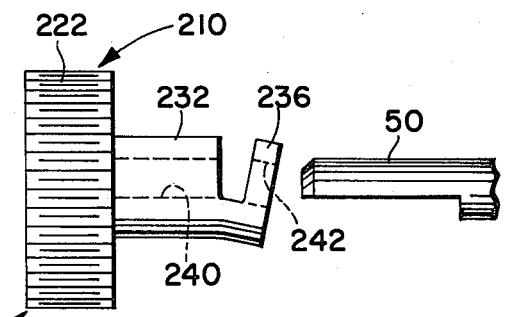
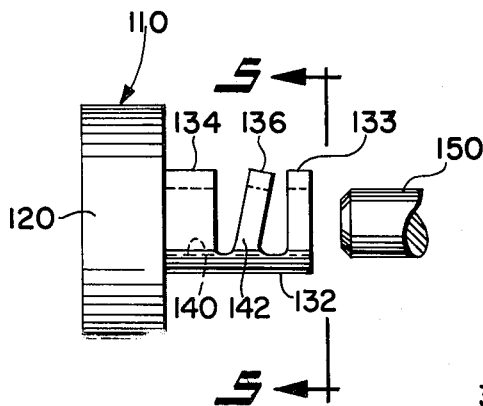
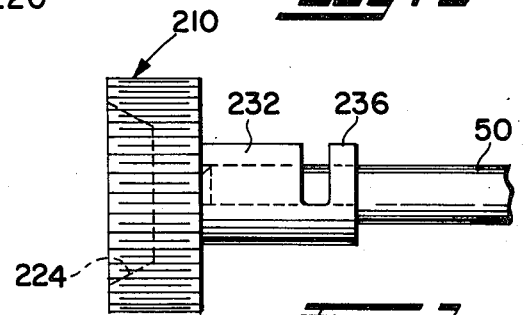
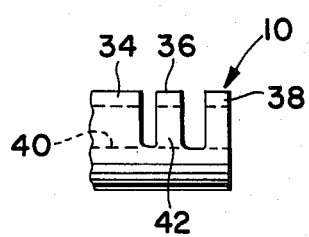
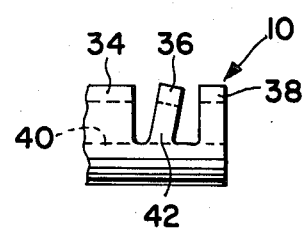

METHOD FOR PRODUCING SELF RETAINING KNOB

CROSS REFERENCE TO RELATED APPLICATIONS

This application is a division of Ser. No. 258,965 filed June 2, 1972 now U.S. Pat. No. 3,808,635 issued May 7, 1974.

BACKGROUND OF THE INVENTION

1. Field of the Invention

This invention relates to shaft engaging members and, more particularly, to one-piece all plastic self retaining knobs.

2. Description of the Prior Art

Earlier molded shaft engaging members, such as dial control knobs and the like, were generally of a complicated multi-piece structure requiring metal clips, spring inserts and/or set screws on either the knob or the shaft to releasably fix the knob to the shaft. These devices were not satisfactory as they were complicated and expensive to produce, included a multiplicity of easily misplaced parts and required a time-consuming and expensive assembly operation to affix the knob to the shaft.

More recently, one-piece all plastic shaft engaging members have been available wherein the shaft and knob were provided with corresponding irregularities as may be seen in U.S. Pat. No. 2,171,361 or corresponding specially mating parts, such as a groove and a detent, to removably attach the knob to the shaft. While such devices did reduce assembly time, they were not totally satisfactory as both the knob and shaft manufacturing procedures were complicated and expensive. The above was also not a satisfactory solution as an ideal shaft receiving member, knob, preferably will receive any standard shaft, such as a round or a D-shaft, and not just specially prepared mating shafts.

SUMMARY OF THE INVENTION

In accordance with the present invention the drawbacks of the prior art have been overcome to the extent that an economically produced, easily installed one-piece all plastic shaft retaining member adapted to receive and retain a given standard shaft has been provided. This is accomplished by providing the shaft engaging member, such as a dial control knob or the like, with a guideway for receiving the shaft in proper axial alignment with the knob. A resilient member having an aperture through which the shaft must pass upon insertion into the guideway is provided in an undeformed position wherein the aperture is not axially aligned with the guideway. As the standard shaft is inserted through the guideway, the aperture is resiliently forced into alignment with the guideway. In this position the resilient member resiliently engages the shaft thus removably mounting the knob thereto. Various degrees of resilient engagement may be obtained by varying the resilient member undeformed position relative to the guideway.

In those applications requiring positive circumferential positioning of the knob relative to the shaft, such as a radio station selector, or those applications in which a large torque must be applied to the shaft, the knob may be utilized with a standard hex, square or D-shaft. In those applications wherein applied torque must be limited the knob of the present invention may be utilized with a round shaft, the knob resilient member allowing the knob to slip rotationally relative to the shaft when greater than the predetermined maximum torque is applied.

Accordingly, it is an object of the present invention to provide a new and improved one-piece all plastic shaft retaining member.

Another object of the present invention is to provide an economically produced, easily installed, one-piece all plastic shaft retaining knob for use with standard shaft ends.

A further object of the present invention is to provide an economically produced, easily installed, one-piece, round shaft retaining all plastic knob capable of transmitting only a predetermined maximum torque to the retained round shaft. An additional object of the present invention is to provide an economical method of producing easily installed, one-piece, molded, shaft retaining knobs for use with standard shaft ends.

The above and further objects and improvements of the invention may best be understood by reference to the following description and accompanying drawings in which:

BRIEF DESCRIPTION OF THE DRAWING

FIG. 1 is a side view of a standard D-shaft and the shaft retaining member of the present invention.

FIG. 2 is a rear view of the shaft retaining member taken along line 2—2 of FIG. 1.

FIG. 3 is an enlarged sectional view of the shaft retention means of the present invention.

FIG. 4 is a side view of a standard round shaft and a modification of the shaft retention member of the present invention.

FIG. 5 is a rear view of the member of FIG. 4 taken along line 5—5 of FIG. 4.

FIG. 6 is a side view of a modification of the present invention.

FIG. 7 is a side view of the device of FIG. 6 assembled to a standard D-shaft.

FIG. 8 is a partial side view of the molded workpiece from which the present invention is produced.

FIG. 9 is a partial side view of the present invention as completed with shaft retention means.

DESCRIPTION OF THE PREFERRED EMBODIMENT

The shaft retaining member of the present invention is illustrated by one-piece all plastic dial control knobs 10 of FIG. 1, 110 of FIG. 4 and 210 of FIG. 6. Although the present invention is illustrated in the form of several dial control knobs, it is understood the present invention is applicable to shaft retaining members in general such as decorative items, safety bumpers at the ends of exposed shaft and the like. It is also understood that the term plastic as used to describe this invention is not intended to limit the invention to a particular material, but is intended to cover all moldable materials suitable for the purpose of the invention.

Referring to FIGS. 1 and 2 the shaft retaining member, or dial control knob 10, may be seen along with a conventional D-shaft 50. The knob 10 includes the dial control portion 20 and the shaft receiving and retaining portion 30. The dial control portion 20 is that portion manually rotated to control the rotational position of shaft 50 and may be knurled or serrated (see knob 210 of FIG. 7) about its outer circumference 12 or may be polygonal in shape to aid in gripping and turning. The face of the dial control portion 14 opposite the shaft receiving means 30 may be shaped in a decorative manner (see knob 210 in FIG. 7), may be plated with a metallic coating and/or may bear indicia of rotational position such as a television channel selector, a radio on-off control, an electric frying pan temperature selector or the like.

The shaft retaining portion 30 is adapted to releasably engage shaft 50 with a minimum of assembly effort and is comprised of an axially extending body 32 having three loop-like projections 34, 36 and 38 extending substantially radially therefrom. Loops 34 and 38 which are relatively rigid with respect to body 32 define a shaft receiving guideway 40 for receiving shaft 50 in proper axial relation to knob 10. Guideway 40 is shaped to closely conform with the received end 52 of standard D-shaft 50 and is thus D-shaped. The use of a standard D-shaft, or a standard square or hex shaft or the like, allows proper circumferential positioning of the knob 10 with respect to controlled shaft 50 as is important for television channel selectors and the like. The use of such a shaft and knob combination also permits the knob user to exert a considerable amount of torque on shaft 50.

Referring more particularly to FIG. 3, it may be seen that loop 36 presents an aperture 42, partially offset from guideway 40, through which shaft end 52 must pass as it is inserted into guideway 40. Loop 36 is resilient with respect to loops 34 and 38 and body 32 and will thus resiliently deform as shaft 50 is forced into guideway 40 allowing the aperture 42 to align with guideway 40 and resiliently and releasably engage shaft 50. Loop 36 may be relatively resilient with respect to guideway 40 as a result of a lesser axial extension than guideway 40. The degree of resilient engagement between resilient loop 36 and shaft 50 is proportional to angle 44, the angle by which undeformed loop 36 is offset from the perpendicular 46 to the axis 48 of shaft 50 and knob 10.

A modified version of the present invention is illustrated in FIGS. 4 and 5 wherein knob 110 is utilized with a round shaft 150 and loops 134, 136 and 138 define a round guideway 140 and aperture 142. In all other respects, knob 110 is identical to previously discussed knob 10.

A round shaft retaining member such as knob 110 is utilized in those applications wherein the circumferential position of dial control portion 20 with respect to shaft 150 is not of importance. A shaft end bumper and a decorative item are also examples of devices which would also utilize a round guideway and aperture. The use of round shaft retaining knob is also very important where it is desired to limit the torque applied to shaft 150 by knob 110. As knob 110 is both axially and rotationally fixed to shaft 150 only by the resilient or frictional engagement of loop 136, any applied torque beyond the rotational resilient engagement will result in knob 110 slipping relative to shaft 150. The maximum torque applied to shaft 150 by knob 110 may be limited by setting the offset of 136 to a resilient engagement corresponding to the predetermined maximum torque value.

A further modification of the present invention may be seen by reference to FIGS. 6 and 7. Knob 210 is illustrated as utilized with a standard D-shaft 50 but could be utilized, with proper modification to guideway 240, with any standard square, round or hex shaft and the like.

Knob 210 differs from knobs 10 and 110 in that a single, relatively long, axially extending rigid body 232 is utilized to define guideway 240 and a resilient loop 236, axially outward from body 232, defines offset aperture 242. In all other aspects of structure and operation, knob 210 corresponds with previously discussed knobs 10 and 110. It is noted that the dial control portion 220 of knob 210 bears serrations 222 and decorative indentations 224 as was discussed in connection with knob 10 above.

FIG. 7 illustrates knob 210 as movably assembled to standard shaft 50 with guideway 240 receiving shaft 50 in proper axial relation to knob 210 and resilient lugs 236 resiliently engaging shaft 50 and retaining knob 210 thereon.

METHOD OF MANUFACTURE

The method of manufacturing the knobs 10, 110 and 210 is illustrated in FIGS. 8 and 9. Earlier attempts to mold the shaft retaining members in completed form were attempted with poor results as the mold was complicated and removal of the part and the molding core was found to be quite difficult. Molding of the knobs with loop 36, 136 or 236, as the case may be, in offset position was also not satisfactory as a separate mold would be necessary for each offset angle 44 and corresponding degree of resilient engagement required by the shaft engaging members intended application.

The present method involves the molding of an unfinished part 310 as is shown in FIG. 8 wherein loops 34, 36 and 38; or body 232 and loop 236, are axially aligned and guideway 40 or 240 is axially aligned with aperture 42 or 242 as the case may be. The part is then slightly heated and loop 36, or 236 as the case may be, is forced under pressure into its desired offset position. By utilization of this method a standard part 310, one for each type of D, round in hex shaft or the like, may be utilized to form a finished self-retaining member 10, 110 or 210 with any desired degree of shaft retention, within a given range.

Although this invention has been described in its preferred forms with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

We claim:

1. The method of manufacturing a molded one-piece shaft retaining device having at least a pair of axially spaced loops defining a guideway for receiving the shaft in proper axial relation to the device and a relatively resilient loop axially interposed at least two of said axially spaced loops defining an aperture partially offset said guideway through which said shaft must pass upon insertion into said guideway comprising the steps of:

a. molding a blank having at least a pair of axially spaced loops defining a guideway and a relatively resilient loop interposed said axially spaced loops defining an aperture wherein the guideway and the aperture are axially aligned, said guideway and said aperture being molded about a substantially straight molding core;

b. removing said molding core from said blank by axially sliding said molding core out of said blank;
c. heating the blank;
d. displacing the relatively resilient loop by the application of pressure to selectively partially offset the aperture with respect to the guideway; and
e. allowing the relatively resilient loop to cool and harden in the displaced position.

2. The method of claim 1 wherein step b) comprises placing the blank under a heat lamp.

3. The method of manufacturing a molded one-piece round shaft retaining knob for applying a predetermined maximum torque to the round shaft having at least a pair of axially spaced loops defining a guideway for receiving the shaft in proper axial relation to the knob and a relatively resilient loop, axially interposed at least two of said axially spaced loops, defining an aperture partially offset said guideway through which said shaft must pass upon insertion into said guideway comprising the steps of:
   a. molding a knob blank having at least a pair of axially spaced loops defining a guideway and a relatively resilient loop interposed at least two of said axially spaced loops defining an aperture wherein the guideway and the aperture are axially aligned; said guideway and aperture being molded about a substantially straight molding core;
   b. removing said molding core from said blank by axially sliding said molding core out of said blank;
   c. heating the blank to render the relatively resilient loop soft and pliable;
   d. displacing the resilient loop, while still heated, to a position whereat the aperture is selectively offset the guideway to an extent which will result in a resilient contact force between the knob and shaft corresponding to the pre-selected maximum torque when said loop is resiliently deformed to receive the shaft; and
   e. allowing the relatively resilient loop to cool and harden in the displaced position.

4. The method of manufacturing a molded one-piece shaft retaining device having a guideway for receiving the shaft in proper axial relation to the device and a relatively resilient loop axially spaced from said guideway defining an aperture partially offset said guideway through which said shaft must pass upon insertion into said guideway comprising the steps of:
   a. molding a blank having a guideway and a relatively resilient loop wherein the guideway and the aperture are axially aligned; said guideway and aperture being molded about a substantially straight molding core;
   b. removing said molding core from said blank by axially sliding said molding core out of said blank;
   c. heating the blank;
   d. displacing the relatively resilient loop by the application of pressure to partially selectively offset the aperture with respect to the guideway; and
   e. allowing the relatively resilient loop to cool and harden in the selectively offset position.

* * * * *